Patented July 9, 1946

2,403,576

UNITED STATES PATENT OFFICE 2,403,576

METHOD OF RECOVERING SUBSTITUTED ACETAMIDES

Chester Wayne Bradley, deceased, late of Old Greenwich, Conn., by Margaret H. Bradley, administratrix, Greenwich, Conn., assignor to American Cyanamid Company, New York, N. Y., a corporation of Maine No Drawing. Application April 18, 1945, Serial No. 589,087

4 Claims. (Cl. 260—561)

The present invention relates to the production of fluoroacetamide, and more particularly to a method of removing fluoroacetamide from a mixture of chloroacetamide, potassium fluoride and/or potassium chloride.

Heretofore it has been proposed to produce fluoroacetamide by heating together chloroacetamide and potassium fluoride at a temperature within the range of from about 100°–180° C. The chloroacetamide and potassium fluoride are thoroughly mixed together, preferably in the proportion of about 2 mols of the former to 3 mols of the latter, and the mixture heated under reduced pressure in a reaction vessel so arranged that the fluoroacetamide, as it is formed, is removed from the reaction zone and condensed. The fluoroacetamide is thus obtained while maintaining the reaction mixture preferably at 130°–145° C. under a pressure of from 15-25 mm. Sub-atmospheric pressures are necessary according to this prior proposal as otherwise a fluoroacetamide distilling temperature causes at least partial decomposition of the desired product. If therefore, a distillation or removal temperature could be used lower than that at which fluoroacetamide decomposes, a simpler and more efficient process would result.

The principal object of this invention is to provide an improved method of removing fluoroacetamide from a mixture of chloroacetamide, potassium fluoride and/or potassium chloride, and thus avoid the use of vacuum equipment as employed in the above known process.

It has now been discovered that an inert liquid, boiling at a temperature within the range of 130°–145° C. at atmospheric pressure, may be incorporated in the mixture of chloroacetamide, potassium fluoride and/or potassium chloride and thus function as a carrier in removing the fluoroacetamide from the reaction zone.

Xylene has been found to be a suitable carrier in the process. For instance, when a mixture of chloroacetamide, potassium fluoride and xylene is heated to a temperature of about 135° C., the xylene gradually distills from the mixture and carries with it the desired fluoroacetamide, the latter being soluble in hot xylene and substantially insoluble in the cold liquid at room temperature or below.

During the distillation, there is the possibility of having some of the chloroacetamide carry over with the fluoroacetamide. Where a very pure fluoroacetamide is desired, the latter may be recovered by esterifying the crude product and thus form, for instance, a mixture of ethyl fluoroacetate and ethyl chloroacetate. The esters are then separated by fractional distillation, and the ethyl fluoroacetate converted to fluoroacetamide by known methods.

The following examples in which the parts are by weight further illustrate the invention:

Example 1

A mixture consisting of 93.5 parts of chloroacetamide, 116 parts of potassium fluoride and 435 parts of xylene was stirred and heated to a temperature of about 135° C., in a vessel equipped with a dropping funnel, stirrer and a take-off fitted with a condenser. The distillate containing xylene was collected in a receiver immersed in an ice-water bath so as to precipitate the fluoroacetamide. Xylene was gradually added to the mixture in the vessel by means of the dropping funnel so as to maintain approximately the original volume. The run was continued until 1218 parts of xylene had been distilled. Upon filtering the cold xylene distillate, there were obtained 42 parts of a white crystalline product which melted at 106°–107° C. As the melting point of pure fluoroacetamide is 108° C., the product was contaminated with only a small quantity of the chloro compound.

Example 2

The procedure of Example 1 was repeated using a larger vessel and a charge consisting of 500 parts of chloroacetamide, 500 parts of potassium fluoride and 1740 parts of xylene. Additional xylene was added during the run and approximately 3480 parts were distilled. 183 parts of a white crystalline product melting at 102° C. were obtained from the xylene distillate. The product by analysis was found to contain 84% fluoroacetamide.

While the invention has been described with particular reference to specific embodiments, it is to be understood that it is not to be limited thereto but it is to be construed broadly and restricted solely by the scope of the appended claims.

It is claimed:

1. In a method of producing fluoroacetamide from a mixture of chloroacetamide, potassium fluoride and xylene heated to a reaction temperature, the steps which include subjecting the reaction mass to a distillation temperature, and separating a mixture of chloroacetamide and fluoroacetamide from the xylene in the distillate.

2. In a method of producing fluoroacetamide from a mixture of chloroacetamide, potassium fluoride and xylene heated to a reaction temperature, the steps which include subjecting the reaction mass to a distillation temperature within the range of 130°–145° C., and separating a mixture of chloroacetamide and fluoroacetamide from the xylene in the distillate.

3. In a method of producing fluoroacetamide from a mixture of chloroacetamide, potassium fluoride and xylene heated to a reaction temperature, the steps which include subjecting the reaction mass to a distillation temperature of about 135° C., and separating a mixture of chloroacetamide and fluoroacetamide from the xylene in the distillate.

4. In a method of producing fluoroacetamide from a mixture of chloroacetamide, potassium fluoride and xylene heated to a reaction temperature, the steps which include subjecting the reaction mass to a distillation temperature, and separating a mixture of chloroacetamide and fluoroacetamide from the xylene in the distillate by cooling the distillate to a fluoroacetamide precipitating temperature.

MARGARET H. BRADLEY,
*Administratrix of the Estate of Chester Wayne Bradley, Deceased.*